(12) United States Patent
Hong

(10) Patent No.: US 10,768,821 B2
(45) Date of Patent: Sep. 8, 2020

(54) MEMORY SYSTEM AND METHOD OF OPERATING THE SAME

(71) Applicant: SK hynix Inc., Gyeonggi-do (KR)

(72) Inventor: Sung Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/944,929

(22) Filed: Apr. 4, 2018

(65) Prior Publication Data

US 2019/0050152 A1 Feb. 14, 2019

(30) Foreign Application Priority Data

Aug. 8, 2017 (KR) ........................ 10-2017-0100297

(51) Int. Cl.
*G06F 12/00* (2006.01)
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0652* (2013.01); *G06F 3/0658* (2013.01); *G06F 3/0679* (2013.01); *G06F 12/0246* (2013.01); *G06F 12/0253* (2013.01); *G06F 2212/1016* (2013.01); *G06F 2212/1044* (2013.01); *G06F 2212/2022* (2013.01); *G06F 2212/7201* (2013.01); *G06F 2212/7205* (2013.01)

(58) Field of Classification Search
CPC ...... G06F 3/0608; G06F 3/064; G06F 3/0679; G06F 3/0652; G06F 3/0658; G06F 12/0246; G06F 12/253; G06F 2212/2022; G06F 2212/1044; G06F 2212/7201; G06F 2212/1016; G06F 2212/7205
See application file for complete search history.

(56) References Cited

U.S. PATENT DOCUMENTS

| 5,043,885 A * | 8/1991 | Robinson | G06F 12/124 711/133 |
| 8,874,867 B2 | 10/2014 | Jess | |
| 2010/0306467 A1* | 12/2010 | Pruthi | G06F 3/0611 711/114 |
| 2012/0042118 A1* | 2/2012 | Chou | G11C 16/349 711/103 |
| 2015/0301934 A1* | 10/2015 | Baderdinni | G06F 3/0631 711/103 |
| 2016/0103764 A1 | 4/2016 | Banerjee et al. | |

* cited by examiner

*Primary Examiner* — Kalpit Parikh
(74) *Attorney, Agent, or Firm* — IP & T Group LLP

(57) ABSTRACT

There are provided a memory system for processing data and a method for operating the memory system. A memory system includes: a memory device including a plurality of memory blocks for storing data; and a controller for creating a SPOT table including a plurality of SPOT entries according to a logical block address (LBA) of the data and managing the SPOT table, using a least recently used (LRU) algorithm.

16 Claims, 8 Drawing Sheets

MEMORY SYSTEM AND METHOD OF OPERATING THE SAME

CROSS-REFERENCE TO RELATED APPLICATION

The present application claims priority to Korean patent application number 10-2017-0100297 filed on Aug. 8, 2017, which is incorporated herein by reference in its entirety.

BACKGROUND

1. Field of Invention

Exemplary embodiments of the present disclosure relate to a memory system including a nonvolatile memory device. Particularly, exemplary embodiments relate to a memory system capable of efficiently managing SPOT data and a method of operating the memory system.

2. Description of the Related Art

The paradigm of recent computing environments has been transitioning to ubiquitous computing environments in which it is possible to use computing systems anywhere and anytime. This transition facilitates increasing usage of portable electronic devices such as mobile phones, digital cameras, notebook computers, and the like. Such portable electronic devices may generally include a memory system using a memory device, i.e., a data storage device. The data storage device is used as a main memory device or auxiliary memory device for the portable electronic devices.

A data storage device using a memory device has excellent stability and durability, high information access speed, and low power consumption, since there is no mechanical driving part. As an example of memory systems having such advantages, the data storage device includes a universal serial bus (USB) memory device, memory cards having various interfaces, a solid state drive (SSD), and the like.

SUMMARY

Embodiments provide a memory system capable of efficiently managing SPOT data generated by a work load, and a method for operating the same.

According to an aspect of the present disclosure, there is provided a memory system including: a memory device including a plurality of memory blocks for storing data; and a controller configured to create a SPOT table including a plurality of SPOT entries according to a logical block address (LBA) of the data and to manage the SPOT table, using a least recently used (LRU) algorithm.

According to an aspect of the present disclosure, there is provided a memory system including: a memory device including a plurality of memory blocks for storing data; a processor configured to create a SPOT table including a plurality of SPOT entries according to an LBA of the data and manage the SPOT table, using an LRU algorithm; and a memory configured to store the SPOT table, wherein the processor deletes a SPOT entry of which frequency of use is low among the plurality of SPOT entries, using the LRU algorithm.

According to an aspect of the present disclosure, there is provided a method for operating a memory system, the method including: creating a SPOT table including a plurality of SPOT entries according to an LBA of data; if a new SPOT entry is generated by overall operations performed in response to a request of a host, allowing the new SPOT entry to be included in the plurality of SPOT entries and deleting a tail entry among the plurality of SPOT entries; and when the frequency of use of a selected SPOT entry among the plurality of SPOT entries increases in response to the request of the host, moving the selected SPOT entry in the direction of a head entry among the plurality of SPOT entries.

According to an aspect of the present disclosure, there is provided a method for operating a memory system, the method including: inserting a new SPOT entry to correspond a highest SPOT count value in a SPOT table including a plurality of SPOT entries arranged in descending order of SPOT count values while deleting a currently arranged SPOT entry corresponding to a lowest SPOT count value from the SPOT table; changing the arrangement of the SPOT entries of the SPOT table according to access to a memory device; and controlling the memory device to perform SPOT handling according to the SPOT table.

DETAILED DESCRIPTION

Exemplary embodiments will now be described in more detail hereinafter with reference to the accompanying drawings; however, the embodiments are examples and may be embodied in different forms and should not be construed as limited to the embodiments set forth herein. Rather, these embodiments are provided so that this disclosure will be thorough and complete, and will fully convey the scope of the example embodiments to those skilled in the art.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

The terminology used herein is for the purpose of describing particular embodiments only and is not intended to be limiting of the present invention.

As used herein, singular forms may include the plural forms as well, unless the context clearly indicates otherwise.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, the various embodiments of the present invention will be described in detail with reference to the attached drawings.

Figure 1:
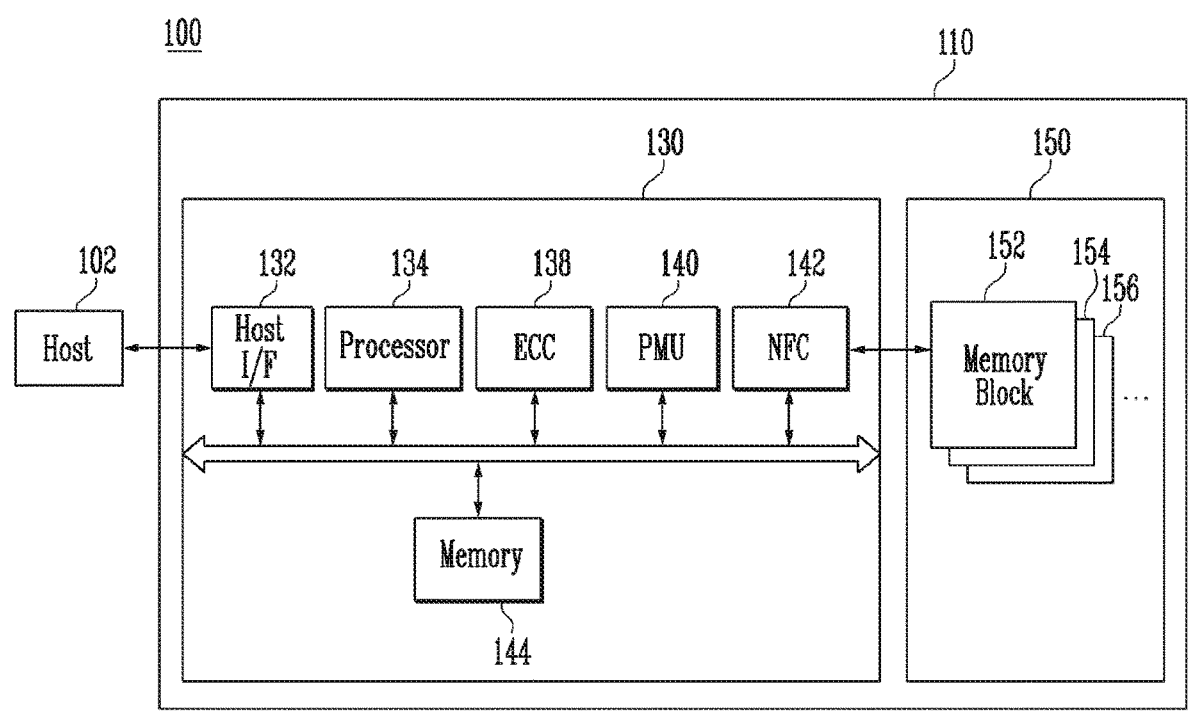
FIG. 1 is a block diagram illustrating an example of a data processing system including a memory system according to an embodiment of the present disclosure.

FIG. 1 is a block diagram illustrating an example of a data processing system 100 including a memory system according to an embodiment of the present disclosure.

Referring to FIG. 1, the data processing system 100 may include a host 102 and a memory system 110.

The host 102 may include portable electronic devices such as mobile phones, MP3 players, laptop computers, and the like, or electronic devices such as desktop computers, game consoles, TVs, projectors, and the like.

In addition, the memory system 110 may operate in response to a request of the host 102. In particular, the memory system 110 may store data accessed by the host 102. In other words, the memory system 110 may be used as a main memory device or auxiliary memory device of the host 102. Here, the memory system 110 may be implemented with any one of various types of storage devices according to a host interface protocol coupled to the host 110. For example, the memory system 110 may be implemented with any one of various types of storage devices such as a solid state drive (SSD), a multi-media card (MMC) of an MMC, embedded MMC (eMMC), reduced size MMC (RS-MMC) or micro-MMC type, a secure digital (SD) card of an SD, mini-SD or micro-SD type, an universal storage bus (USB) storage device, a universal flash storage (UFS) device, a compact flash (CF) card, a smart media (SMC) card, and a memory stick.

In addition, the storage devices for implementing the memory system 110 may be classified into volatile memory devices such as a dynamic random access memory (DRAM) and a static random access memory (SRAM), and non-volatile memory devices such as a read only memory (ROM), a mask read only memory (MROM), a programmable read only memory (PROM), an electrically programmable read only memory (EPROM), an electrically erasable and programmable read only memory (EEPROM), a ferro-magnetic random access memory (FRAM), a phase change random access memory (PRAM), a magnetic random access memory (MRAM), a resistive random access memory (RRAM), and a flash memory.

Also, the memory system 110 may include a memory device 150 that stores data accessed by the host 102 and a controller 130 that controls data to be stored in the memory device 150.

Here, the controller 130 and the memory device 150 may be integrated into one semiconductor device. As an example, the controller 130 and the memory device 150 may be integrated into one semiconductor device to constitute an SSD. When the memory system 110 is used as the SSD, the operating speed of the host 102 coupled to the memory system 110 can be remarkably improved.

The controller 130 and the memory device 150 may be integrated into one semiconductor device, to constitute a memory card. As another example, the controller 130 and the memory device 150 may be integrated into one semiconductor device, to constitute a memory card such as a PC card (personal computer memory card international association (PCMCIA)), a compact flash (CF) card, a smart media card (SM or SMC), a memory stick, a multimedia card (MMC, RS-MMC or MMCmicro), an SD card (SD, mini-SD, micro-SD or SDHC), or a universal flash storage (UFS).

As yet another example, the memory system 110 may constitute one of various components of an electronic device such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional television, a digital audio recorder, a digital audio player, a digital picture recorder, a digital picture player, a digital video recorder, a digital video player, a storage that constitutes a data center, a device capable of transmitting/receiving information in a wireless environment, one of various electronic devices that constitute a home network, one of various electronic devices that constitute a computer network, one of various electronic devices that constitute a telemetics network, an RFID device, or one of various components that constitute a computing system.

Meanwhile, the memory device 150 of the memory system 110 may retain stored data even when power is not supplied. In particular, the memory system 110 may store data provided from the host 102 through a write operation, and provide the stored data to the host 102 through a read operation.

The memory device 150 may include a plurality of memory blocks 152, 154, and 156, and each of the memory blocks 152, 154, and 156 may include a plurality of pages. In addition, each of the pages may include a plurality of memory cells coupled to a plurality of word lines. Also, the memory device 150 may include a plurality of planes in which the plurality of memory blocks 152, 154, and 156 are respectively included. In particular, the memory device 150 may include a plurality of memory dies in which the plurality of planes are respectively included. The memory device 150 may be a nonvolatile memory device, e.g., a flash memory. In this case, the flash memory may have a three-dimensional (3-D) stack structure.

A structure of the memory device 150 and a three-dimensional stack structure of the memory device 150 will be described in more detail with reference to FIGS. 2 to 4.

The controller 130 of the memory system 110 may control the memory device 150 in response to a request from the host 102. The controller 130 provides data read from the memory device 150 to the host 102, and stores data provided from the host 102 in the memory device 150. To this end, the controller 130 controls read, write, program, and erase operations of the memory device 150.

In addition, the controller 130 may perform a read reclaim operation to manage a SPOT that is an assembly or assembly group in which a work load is concentrated on a specific address, thereby improving the reliability of data corresponding to the SPOT. The controller 130 may create a table including a plurality of SPOT entries according to a logical block address (LBA) of data, determine a frequency of use of each SPOT entry according to the number of times of reading and writing data having an LBA corresponding to the SPOT entry, and manage the table by re-determining an order of priority of the SPOT entries according to the frequencies of use of the SPOT entries. A method of managing SPOT entries will be described later.

The controller 130 may include a host interface (host I/F) unit 132, a processor 134, an error correction code (ECC) unit 138, a power management unit (PMU) 140, a NAND flash controller (NFC) 142, and a memory 144. Although FIG. 1 shows that the controller 130 is included in the memory system 110, it is for illustrative purposes only, and the controller 130 may be provided separately or included in the host 102.

The host I/F unit 134 may process commands and data of the host 102, and may communicate with the host 102 through at least one of various interface protocols, such as a universal serial bus (USB) protocol, a multimedia card (MMC) protocol, a peripheral component interconnection (PCI) protocol, a PCI-Express (PCI-E) protocol, an advanced technology attachment (ATA) protocol, a Serial-ATA protocol, a Parallel-ATA protocol, a small computer small interface (SCSI) protocol, an enhanced small disk interface (ESDI) protocol, and an integrated drive electronics (IDE) protocol.

The ECC unit 138 may detect and correct an error included in the data read from the memory device 150 when data stored in the memory device 150 is read. In other words, the ECC unit 138 may perform error correction decoding on the data read from the memory device 150, determine whether the error correction decoding has succeeded, output an instruction signal according to the determined result, and correct error bits of the read data by using parity bits generated in an ECC encoding process. When the number of error bits is more than a threshold value of correctable error bits, the ECC unit 138 may not correct the error bits, and may output an error correction fail signal.

The ECC unit 138 may perform error correction by using coded modulation including low density parity check (LDPC) code, Bose, Chaudhuri, and Hocquenghem (BCH) code, turbo code, Reed-Solomon code, convolution code, recursive systematic code (RSC), trellis-coded modulation (TCM), block coded modulation, Hamming code, etc., but the present disclosure is not limited thereto. Also, the ECC unit 138 may include a circuit, system, or device for error correction.

The PMU 140 provides and manages power of the controller 130, i.e., power of components included in the controller 130.

The NFC 142 is a memory interface that may perform interfacing between the controller 130 and the memory device 150 so as to control the memory device 150 in response to a request from the host 102. When the memory device 150 is a flash memory, in particular, a NAND flash memory, the NFC 142 generates a control signal of the memory device 150 and processes data according to the control of the processor 134. It is noted that the present invention is not limited to NAND flash memory/NAND flash interface, and that a suitable memory/storage interface may be selected depending upon the type of the memory device 150.

The memory 144 is an operation memory of the memory system 110 and the controller 130, and may store data for driving the memory system 110 and the controller 130. For example, when the controller 130 controls operations such as a read operation, a write operation, a program operation, and an erase operation, the controller 130 may store data required to perform the operations in the memory 144.

Also, the memory 144 may store a SPOT table of the memory system 110, and store information on a SPOT area determined as a real SPOT according to the SPOT table. The memory 144 may be implemented with a volatile memory, and be implemented with a static random access memory (SRAM), a dynamic random access memory (DRAM), or the like. Also, the memory 144 may store data required to perform operations such as data write and read operations between the host 102 and the memory device 150 and data when the operations such as data write and read operations are performed. In order to store such data, the memory 144 includes a program memory, a data memory, a write buffer/cache, a read buffer/cache, a map buffer/cache, and the like.

The processor 134 may control overall operations of the memory system 110, and control a write or read operation on the memory device 150 in response to a write or read request from the host 102. Here, the processor 134 drives firmware such as a flash translation layer (hereinafter, referred to as 'FTL') so as to control the overall operations of the memory system 110. Also, processor 134 may be implemented with a microprocessor, a central processing unit (CPU), or the like.

The controller 130 may perform an operation requested from the host 102 in the memory device 150 through the processor 134 implemented with the microprocessor, the CPU, or the like. In other words, the controller 130 may perform, together with the memory device 150, a command operation corresponding to a command received from the host 102. Here, the controller 130 may perform a foreground operation as a command operation corresponding to the command received from the host 102.

Also, the controller 130 may perform a background operation on the memory device 150 through the processor 134 implemented with the microprocessor, the CPU, or the like. Here, the background operation on the memory device 150 may include a garbage collection operation in which data stored in an arbitrary memory block in the memory blocks 152, 154, and 156 of the memory device 150 is copied to another arbitrary memory block, a wear leveling operation in which the controller 130 performs a process by swapping between the memory blocks 152, 154, and 156 of the memory device 150 or between data stored in the memory blocks 152, 154, and 156, a map flash operation in which map data stored in the controller 130 is allowed to be stored in the memory blocks 152, 154, and 156 of the memory device 150, a bad block management operation in which an operation of performing bad management on the memory device 150 is performed by checking bad blocks in a plurality of memory blocks 152, 154, and 156 included in the memory device 150, or the like.

In particular, in the memory system 110 according to the embodiment of the present disclosure, the memory device 150 may be controlled to perform a read reclaim operation to manage a SPOT through the processor 134, thereby improving the reliability of data corresponding to the SPOT.

Figure 2:
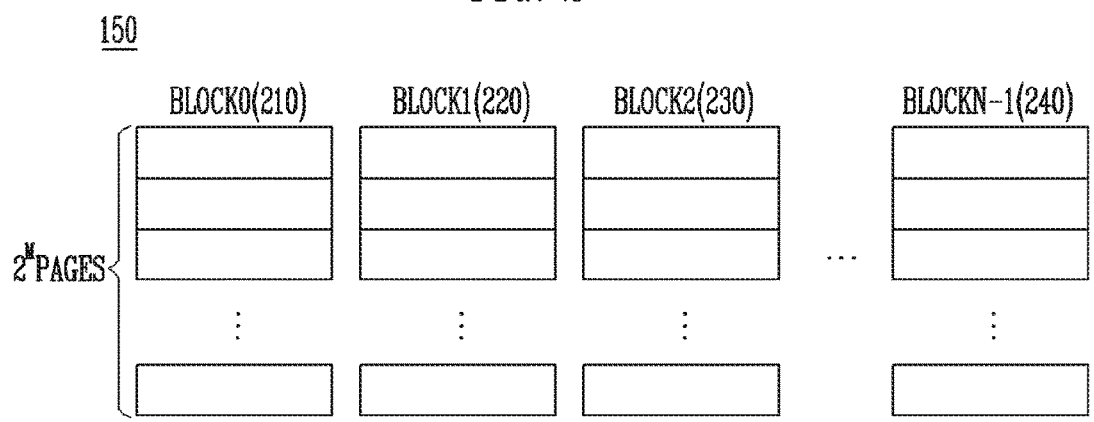
FIG. 2 is a schematic diagram illustrating an example of a memory device in the memory system according to the embodiment of the present disclosure.

FIG. 2 is a schematic diagram illustrating an example of the memory device 150 in the memory system 110 of FIG. 1 according to the embodiment of the present disclosure. FIG. 3 is a circuit diagram illustrating an exemplary configuration of a memory cell array of memory blocks in the memory device 150 shown in FIG. 2. FIG. 4 is a diagram illustrating an exemplary three-dimensional (3-D) structure of the memory device 150 shown in FIG. 2.

In describing the memory device 150 according to the embodiment of the present disclosure, references will be made to FIGS. 2 to 4.

Referring to FIG. 2, the memory device 150 may include a plurality of memory blocks, e.g., BLOCK0 210, BLOCK1 220, BLOCK2 230, and BLOCKN-1 240, and each of the memory blocks 210, 220, 230, and 240 may include a plurality of pages, e.g., $2^M$ pages, the number of which may vary according to circuit design. That is, a case where each of the plurality of memory blocks includes $2^M$ pages is illustrated as an example, but each of the plurality of memory blocks may include M pages. Each of the pages may include a plurality of memory cells coupled to a plurality of word lines.

Also, in the memory device 150, the plurality of memory blocks may include a single level cell (SLC) memory block, a multi-level cell (MLC), and the like according to the number of bits of data stored in one memory cell. Here, the SLC memory block may include a plurality of pages implemented by memory cells each storing one bit of data, and has fast data calculation performance and high durability. The MLC memory block includes a plurality of pages implemented by memory cells each storing multiple bits of data (e.g., two or more bits), and has a data storage space larger than that of the SLC memory block. The MLC memory block including a plurality of pages implemented by memory cells each storing three or four bits of data may be classified as a triple level cell (TLC) or quad level cell (QLC) memory block.

Each of the memory blocks 210, 220, 230, and 240 may store data provided from the host 102 through a write operation, and provide the stored data to the host 102 through a read operation.

Figure 3:
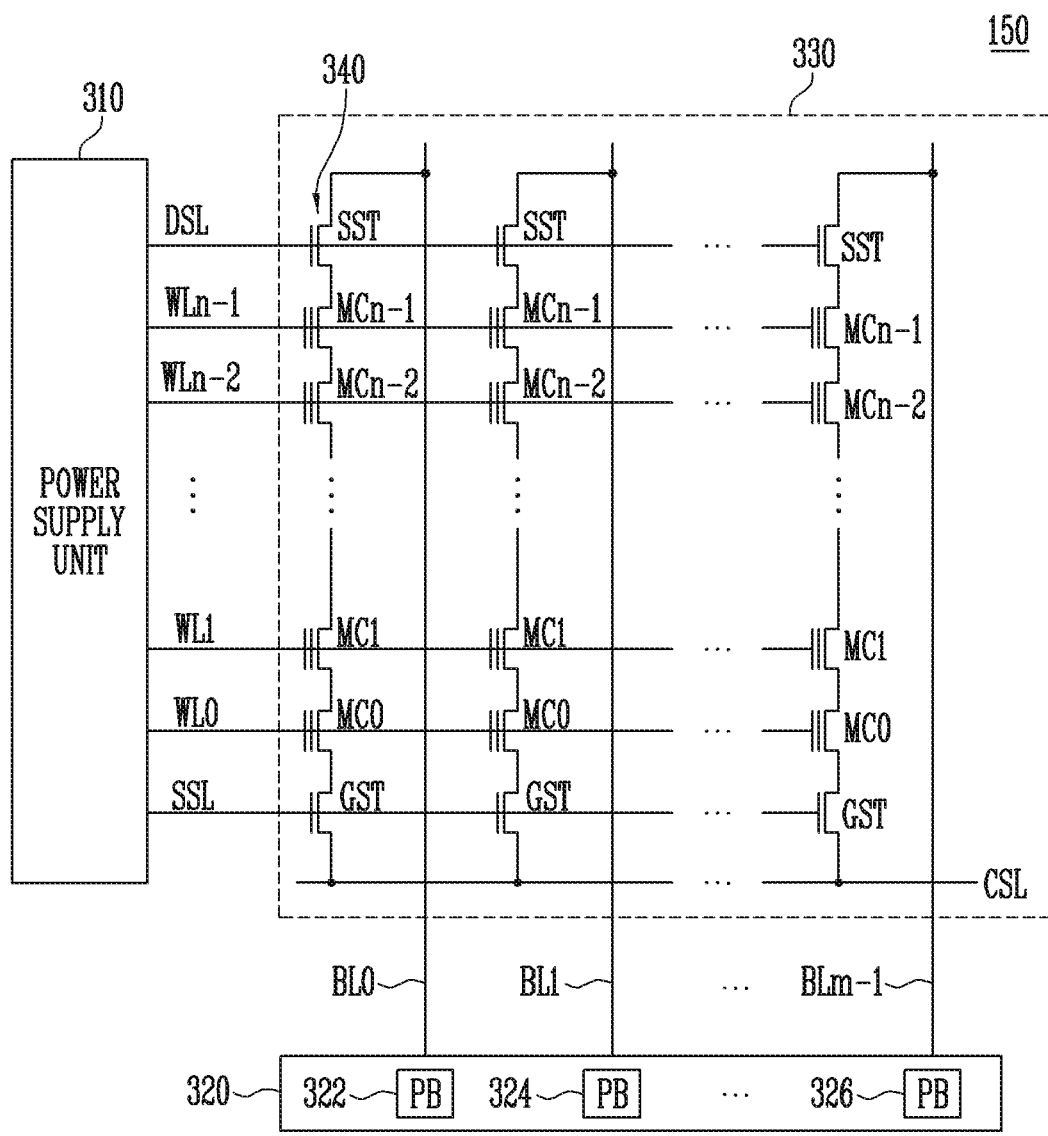
FIG. 3 is a circuit diagram illustrating an exemplary configuration of a memory cell array of memory blocks in the memory device shown in FIG. 2.

Referring to FIG. 3, a memory block 330, which may correspond to any of the plurality of memory blocks 152, 154, and 156 (shown in FIG. 1) included in the memory device 150 of the memory system 110, may include a plurality of cell strings 340 coupled to a plurality of corresponding bit lines BL0 to BLm-1. The cell string 340 of each column may include at least one drain select transistor DST and at least one source select transistor SST. A plurality of memory cells MC0 to MCn-1 may be coupled in series between the select transistors DST and SST. Each of the memory cells MC0 to MCn-1 may be embodied by an MLC capable of storing a plurality of bits of data information per cell. Each of the cell strings 340 may be electrically coupled to a corresponding bit among the plurality of bit lines BL0 to BLm-1, respectively. For example, as illustrated in FIG. 3, the first cell string is coupled to the first bit line BL0, and the last cell string is coupled to the last bit line BLm-1.

Although FIG. 3 shows each of the memory block 330 configured as a NAND flash memory, the plurality of memory blocks 152, 154, and 156 included in the memory device 150 according to the embodiment of the present disclosure is not limited to only the NAND flash memory, and may be implemented with a NOR flash memory, a hybrid flash memory in which at least two types of memory cells are combined, a One-NAND flash memory in which a controller is embedded in a memory chip, or the like. In addition, the memory device 150 according to the embodiment of the present disclosure may be implemented with not only a flash memory device in which a charge storage layer is configured with a conductive floating gate but also a charge trap flash (CTF) memory device in which a charge storage layer is configured with an insulating layer, etc.

The memory device 150 may further include a power supply unit 310, which may provide word line voltages (e.g., a program voltage, a read voltage, a pass voltage, and the like) to be supplied to each of the word lines and a voltage to be supplied to a bulk (e.g., a well region) in which memory cells are formed according to an operation mode. In this case, a voltage generating operation of the power supply unit 310 may be performed under the control of a control circuit (not shown). Also, the power supply unit 310 may generate a plurality of variable read voltages so as to generate a plurality of read data. The power supply unit 310 may select one of memory blocks (or sectors) of the memory cell array and select one of word lines of the selected memory block, in response to the control of the control circuit. The power supply unit 310 may provide a word line voltage to each of the selected word line and the other unselected word lines.

The memory device may include a read/write circuit 320, which may be controlled by the control circuit, and operate as a sense amplifier or a write driver according to an operation mode. For example, during a verify/normal read operation, the read/write circuit 320 may operate as a sense amplifier for reading data from the memory cell array. Also, during a program operation, the read/write circuit 320 may operate as a write driver for driving bit lines according to data to be stored in the memory cell array. During the program operation, the read/write circuit 320 may receive data to be written in the memory cell array from a buffer (not shown), and drive bit lines according to the received data. To this end, the read/write circuit 320 may include a plurality of page buffers (PB) 322, 324, and 326 respectively corresponding to columns (or bit lines) or column pairs (or bit line pairs), and a plurality of latches (not shown) may be included in each of the page buffers 322, 324, and 326.

Figure 4:
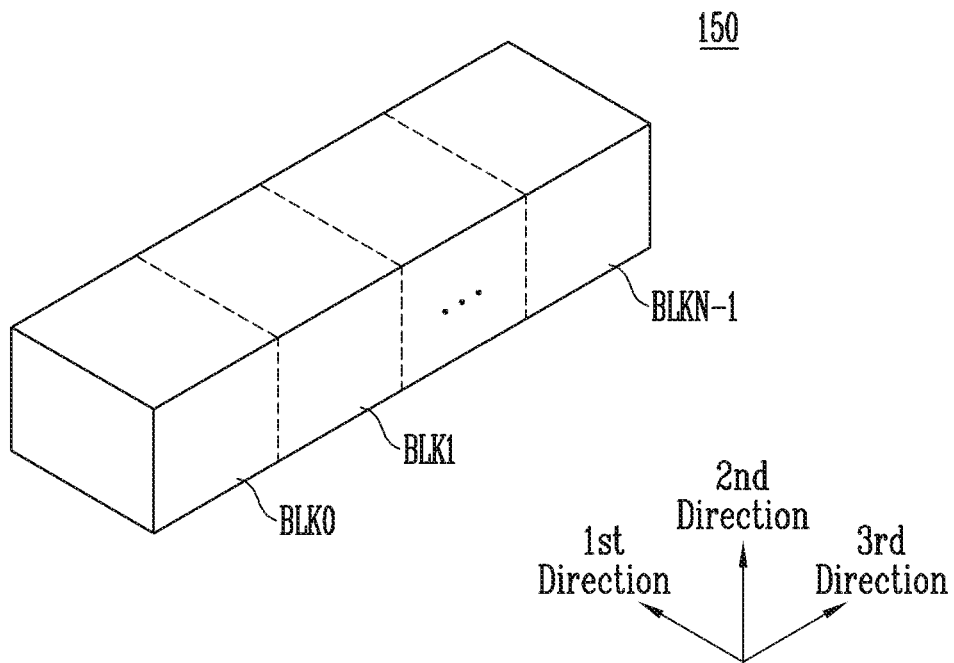
FIG. 4 is a diagram illustrating an exemplary three-dimensional (3-D) structure of the memory device shown in FIG. 2.

Referring to FIG. 4, the memory device 150 may be implemented as a two-dimensional or three-dimensional memory device. In particular, the memory device 150 may be implemented as a nonvolatile memory device having a three-dimensional stack structure as shown in FIG. 4. When the memory device 150 is implemented in a three-dimensional structure, the memory device 150 may include a plurality of memory blocks BLK0 to BLKN-1. Here, FIG. 4 is a block diagram illustrating the memory blocks 152, 154, and 156 of the memory device 150 shown in FIG. 1, and each of the memory blocks 152, 154, and 156 may be implemented in a three-dimensional structure (or vertical structure). For example, each of the memory blocks 152, 154, and 156 may include structures extending along first to third directions, e.g., x-axis, y-axis, and z-axis directions, and be implemented in a three-dimensional structure.

Figure 5:
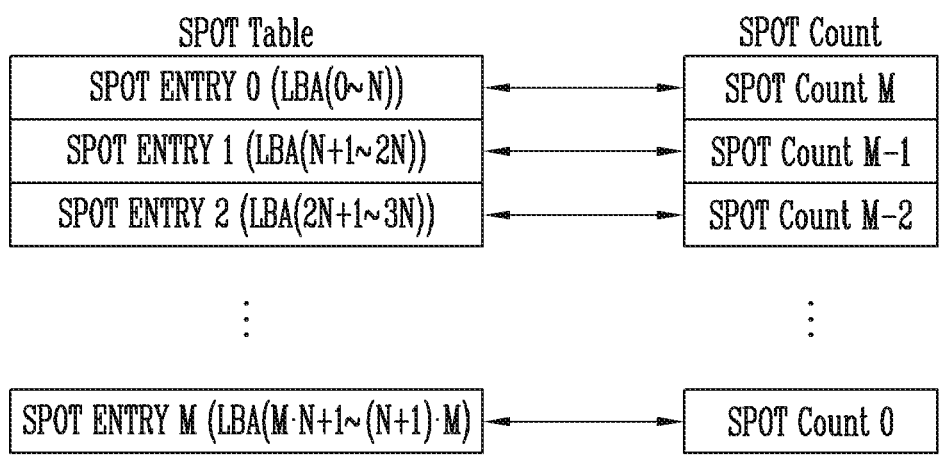
FIG. 5 is a configuration diagram illustrating a SPOT table according to the embodiment of the present disclosure.

FIG. 5 is a configuration diagram illustrating a SPOT table according to the embodiment of the present disclosure.

Referring to FIG. 5, a SPOT table may be created through the processor 134 shown in FIG. 1. The SPOT table may include a plurality of SPOT entry indices SPOT ENTRY 0 to SPOT ENTRY M. As an example, the SPOT table may be configured with a plurality of spot entry indexes, based on a logical block address (LBA) range of data. For example, SPOT data corresponding to LBA(0) to LBA(N) may be represented as SPOT entry index SPOT ENTRY 0, SPOT data corresponding to LBA(N+1) to LBA(2N) may be represented as SPOT entry index SPOT ENTRY 1, SPOT data corresponding to LBA(2N+1) to LBA(3N) may be represented as SPOT entry index SPOT ENTRY 2, and SPOT data corresponding to LBA(M*N+1) to LBA((N+1)*M) may be defined as SPOT entry index SPOT ENTRY M.

In addition, each of the plurality of SPOT entry indices SPOT ENTRY 0 to SPOT ENTRY M may have a corresponding SPOT count value SPOT Count. For example, the SPOT table may be configured such that the SPOT entry index SPOT ENTRY 0 has SPOT Count M, the SPOT entry index SPOT ENTRY 1 has SPOT Count M−1, the SPOT entry index SPOT ENTRY 2 has SPOT Count M−2, and the SPOT entry index SPOT ENTRY M has SPOT Count 0. In the embodiment of the present disclosure, the SPOT table is configured such that SPOT count values SPOT count corresponding to a plurality of SPOT entry indices are sequentially decreased. However, the present disclosure is not limited thereto, and the SPOT table is configured such that SPOT count values SPOT count corresponding to a plurality of SPOT entry indices are different from one another. That is, the SPOT table is configured such that SPOT count values SPOT count corresponding to a plurality of SPOT entry indices are not the same as one another.

According to the above-described configuration of the SPOT table, when assuming that the unit size of LBA is 4 KB, the range of LAB is 0 to 1000, and the number of processable SPOT entries is 1000, a SPOT area of a total of 4 GB may be managed, and the memory capacity for a SPOT table used herein may be managed as a memory capacity obtained by adding a memory size of SPOT entries and a memory size for managing count values. For example, when a SPOT entry index includes a head entry of 2 bytes, a tail entry of 2 bytes, and a count size of 2 bytes, a SPOT area may be managed with a memory capacity of about 6 KB.

Figure 6:
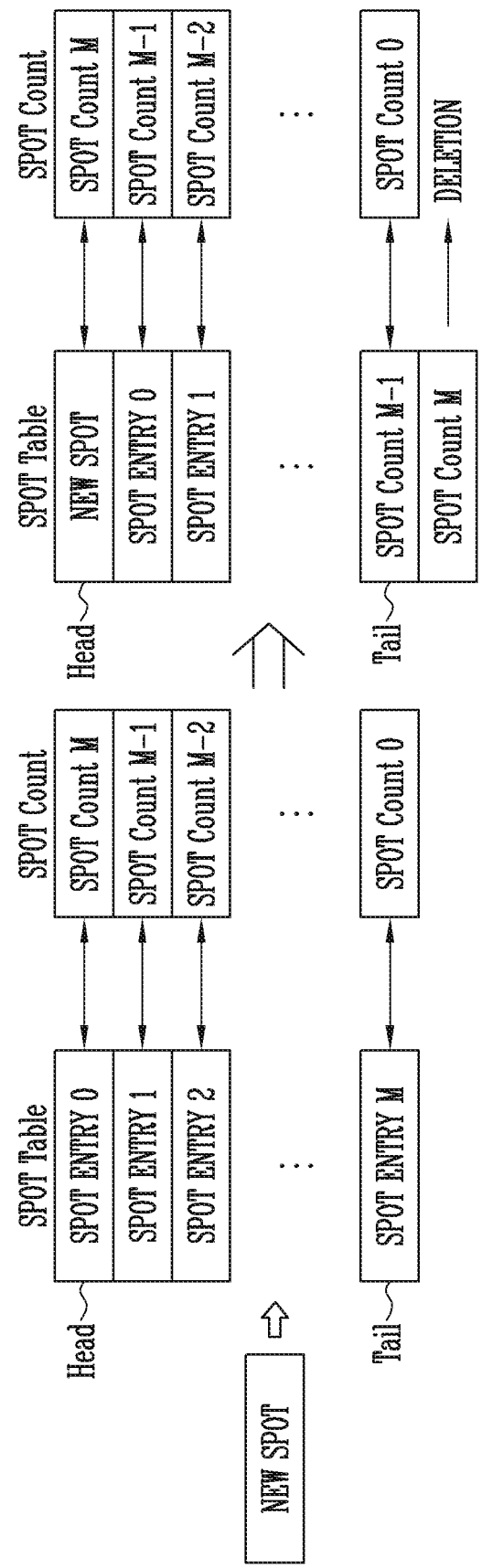
FIGS. 6 and 7 are configuration diagrams illustrating a method of managing SPOT entries according to the embodiment of the present disclosure.
Figure 7:
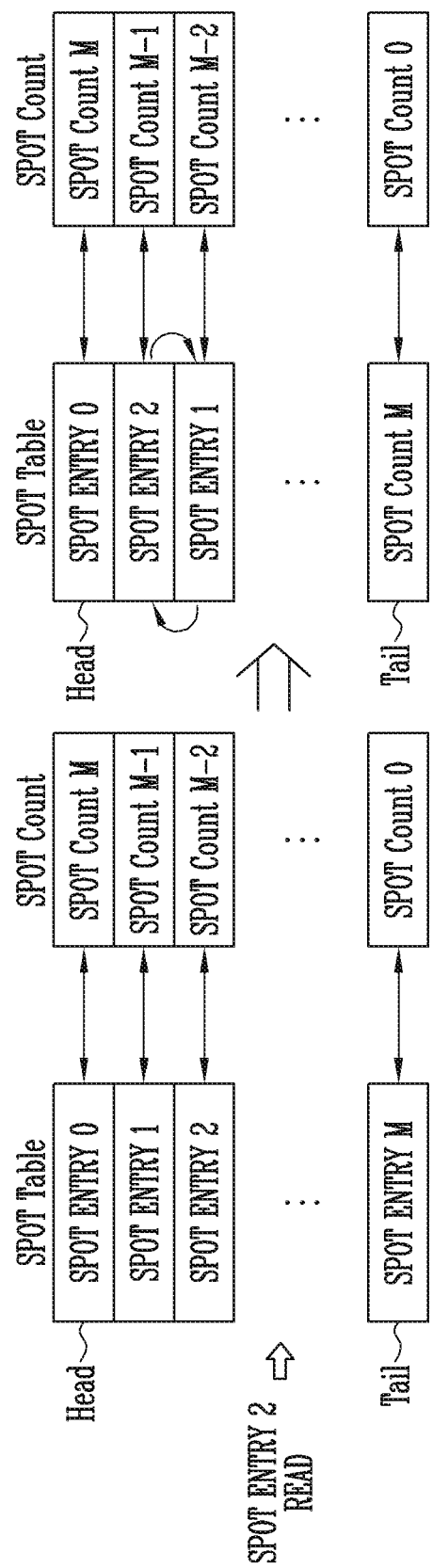

FIGS. 6 and 7 are configuration diagrams illustrating a method for managing SPOT entries according to the embodiment of the present disclosure.

FIG. 6 is a configuration diagram describing a method of reconstructing the SPOT table when a new SPOT entry is generated after the SPOT table is initially configured with a plurality of SPOT entry indices, based on the LBA range of data as described in FIG. 5.

Referring to FIG. 6, when a new SPOT entry index NEW SPOT, which is not currently included in the SPOT table, is generated in response to a read request from the host (not shown), the SPOT table is configured such that the new SPOT entry index NEW SPOT is inserted into a head index Head of the SPOT table, and the plurality of existing SPOT entry indices SPOT ENTRY 0 to SPOT ENTRY M are moved one by one in the direction of a tail index Tail. At this time, the total number of SPOT entry indices is equally maintained by deleting the SPOT entry index SPOT ENTRY M that is the existing tail index Tail. In addition, SPOT count values of the plurality of SPOT entry indices SPOT ENTRY 0 to SPOT ENTRY M−1 are decreased one by one. That is, the SPOT table is configured such that the newly generated SPOT entry index NEW SPOT is inserted into the head index Head and the other SPOT entry indices are moved one by one in the direction of the tail index Tail, and the total number of SPOT entry indices is equally maintained by deleting the last SPOT entry index SPOT ENTRY M.

FIG. 7 is a configuration diagram describing a method of reconstructing the SPOT table when the number of times of performing a read operation is increased by performing the read operation on the existing SPOT entry after the SPOT table is initially configured with a plurality of SPOT entry indices, based on the LBA range of data as described in FIG. 5.

In this particular embodiment, a case where a read operation on the SPOT entry index SPOT ENTRY 2 is performed will be described as an example.

Referring to FIG. 7, when the number of times of performing a read operation on the existing SPOT entry index SPOT ENTRY 2, which is currently included in the SPOT table, increases in response to a read request from the host, the SPOT count value of the SPOT entry index SPOT ENTRY 2 is increased by 1 to be set to M−1, and the position of the SPOT entry index SPOT ENTRY 2 is moved in the direction of the head index Head. In addition, the SPOT count value of the SPOT entry index SPOT ENTRY 1 that had the SPOT count value of M−1 is decreased by 1 to be set to M−2, and the position of the SPOT entry index SPOT ENTRY 1 is moved in the direction of the tail index Tail. That is, the position of the SPOT entry index SPOT ENTRY 2 on which the read operation is performed is exchanged with the position of the SPOT entry index SPOT ENTRY 1 that exist in the direction of the head index Head. Therefore, as the read operation is performed on a SPOT entry index, the corresponding SPOT entry index is moved in the direction of the head index Head, and SPOT entry indices on which the read operation is not performed are gradually moved in the direction of the tail index Tail.

As described in FIG. 7, the frequencies of use of SPOT entry indices can be checked by changing count values of the SPOT entry indices according to the number of times of performing the read operation. When a new SPOT entry index is generated, the SPOT table can be managed by deleting a SPOT entry index with the lowest frequency of use. That is, a SPOT entry index with a low frequency of use is deleted using a least recently used (LRU) algorithm, so that the SPOT table can be easily and efficiently managed.

Figure 8:
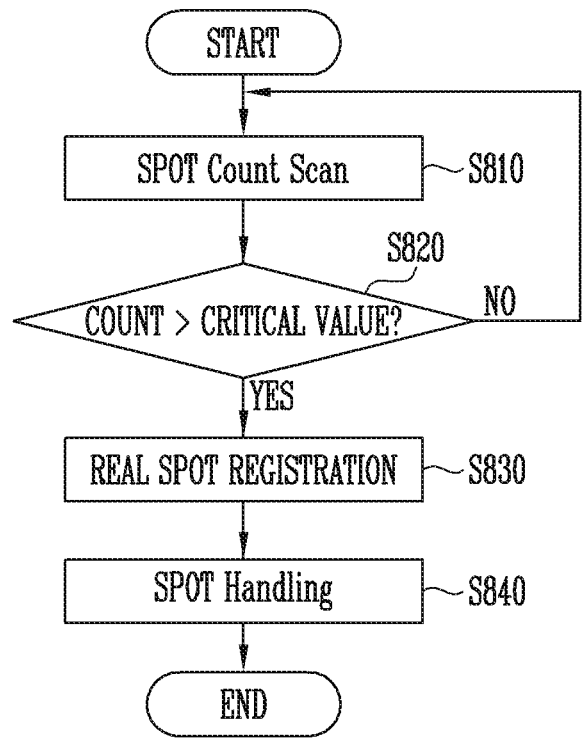
FIG. 8 is a flowchart illustrating a method of operating the memory system, based on a SPOT entry, according to the embodiment of the present disclosure.

FIG. 8 is a flowchart illustrating a method of operating the memory system, based on a SPOT entry, according to the embodiment of the present disclosure.

Referring to FIG. 8, at step S810, the controller 130 of FIG. 1 performs a SPOT count scan operation. In more detail, the processor 134 of the controller 130 periodically performs the SPOT count scan operation when the memory system 110 is operated. The processor 134 checks SPOT count values of a plurality of SPOT entry indices included in a SPOT table stored in the memory 144, based on the SPOT table.

At step S820, the processor 134 compares a SPOT count value of each of the plurality of SPOT entry indices with a critical value. When the count value is lower than a critical value (i.e., "NO" at step S820), the processor 134 controls the memory device 150 to perform operations, and step S810 is re-performed while the memory device 150 performs the operations.

When the count value is higher than the critical value (i.e., "YES" at step S820), the processor 134 determines the corresponding SPOT entry index as a real SPOT, and stores the corresponding SPOT entry index in the memory 144 at step S830.

Then, at step S840 the processor 134 performs SPOT handling on data having an LBA corresponding to the SPOT entry index determined as the real SPOT. For example, the processor 134 performs a read reclaim operation on the data having the LBA corresponding to the SPOT entry index. That is, the processor 134 performs a write operation on the memory device 150 by reading the data having the LBA corresponding to the SPOT entry index from the memory device 150 and assigning a new LBA to the read data, so that the reliability of the data can be improved.

As described above, according to the embodiment of the present disclosure, a plurality of SPOT entries are managed by dividing SPOT data in a logical block address (LBA) range. When a new SPOT entry is generated or when the number of times of performing a read operation on the existing SPOT entry increases, the SPOT table is managed using the LRU algorithm, so that SPOT data can be efficiently managed. In addition, when the SPOT count value of a SPOT entry index exceeds the critical value, a read reclaim operation is performed by determining the SPOT entry index as a real SPOT, so that the reliability of the SPOT data can be improved.

Figure 9:
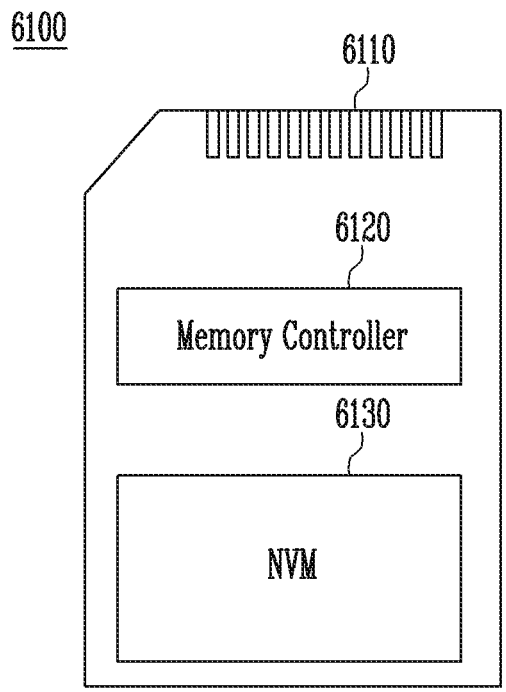
FIGS. 9 to 12 are diagrams illustrating application examples of the data processing system including the memory system according to the embodiment of the present disclosure.

FIG. 9 is a diagram schematically illustrating an application example of the data processing system including the memory system according to the embodiment of the present disclosure. Here, FIG. 9 is a diagram schematically illustrating a memory card system to which the memory system according to the embodiment of the present disclosure is applied.

Referring to FIG. 9, the memory card system 6100 includes a memory controller 6120, a memory device 6130, and a connector 6110.

More specifically, the memory controller 6120 is coupled to the memory device 6130 implemented with a nonvolatile memory, and is configured to access the memory device 6130. For example, the memory controller 6120 is configured to control a read operation, a write operation, an erase operation, a background operation, and the like. Also, the memory controller 6120 is configured to provide an interface between the memory device and a host. The memory controller 6120 is configured to driver firmware for controlling the memory device 6130. That is, the memory controller 6120 may correspond to the controller 130 in the memory system 110 described in FIG. 1, and the memory device 6130 may correspond to the memory device 150 in the memory system 110 described in FIG. 1.

Accordingly, the memory controller 6120 may include components such as a random access memory (RAM), a processing unit, a host interface, a memory interface, and an error correction unit.

In addition, the memory controller 6120 may communicate with an external device such as the host 102 described in FIG. 1 through the connector 6110. For example, the memory controller 6120, as described in FIG. 1, may be configured to communicate with the external device through at least one of various communication protocols such as such as a universal serial bus (USB) protocol, a multimedia card (MMC) protocol, a peripheral component interconnection (PCI) protocol, a PCI-Express (PCI-E) protocol, an advanced technology attachment (ATA) protocol, a Serial-ATA protocol, a Parallel-ATA protocol, a small computer small interface (SCSI) protocol, an enhanced small disk interface (ESDI) protocol, an integrated drive electronics (IDE) protocol, FireWire, a universal flash storage (UFS) protocol, Wi-Fi, and Bluetooth. Accordingly, the memory system and the data processing system according to the embodiment of the present disclosure can be applied to wired/wireless electronic devices, mobile electronic devices, and the like.

In addition, the memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In addition, the memory controller 6120 and the memory device 6130 may be integrated into a single semiconductor device. As an example, the memory controller 6120 and the memory device 6130 may be integrated into a single semiconductor device to constitute a solid state drive (SSD). The memory controller 6120 and the memory device 6130 may be integrated into a single semiconductor device to constitute a memory card such as a PC card (PCMCIA), a compact flash card (CF), a smart media card (SM, SMC), a memory stick, a multimedia card (MMC, RS-MMC, MMCmicro), an SD card (SD, mini-SD, micro-SD, SDHC) or a universal flash storage (UFS).

Figure 10:
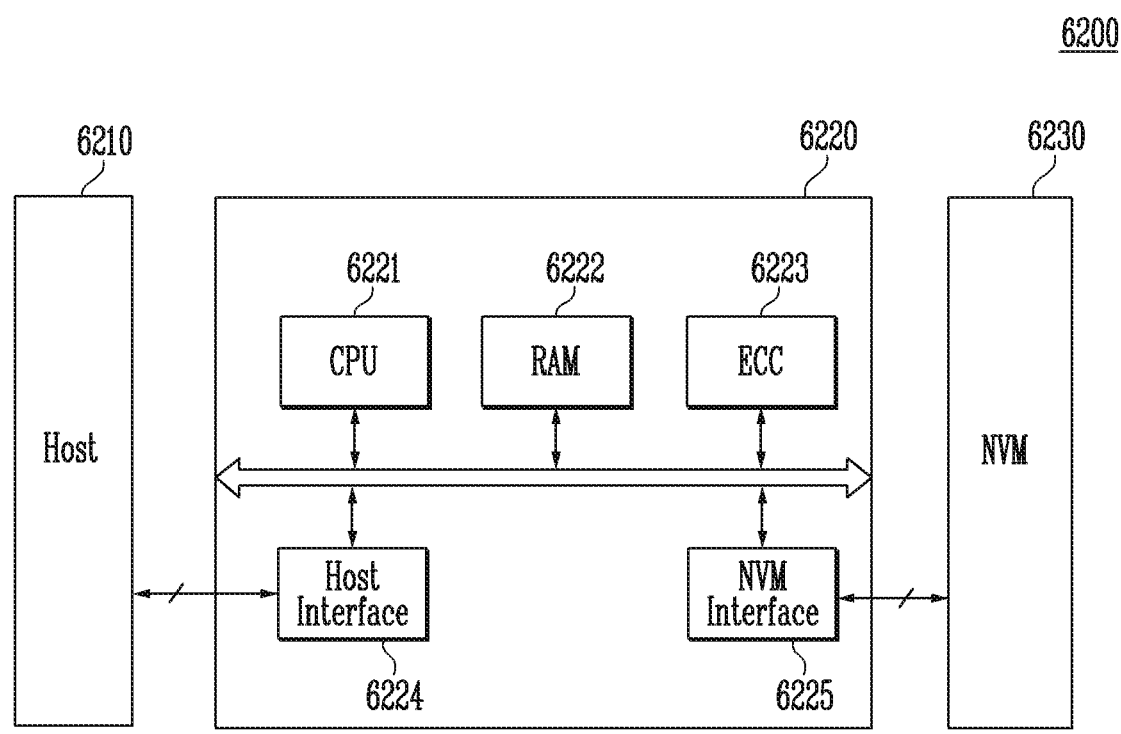

FIG. 10 is a diagram schematically illustrating an application example of the data processing system including the memory system according to the embodiment of the present disclosure.

Referring to FIG. 10, the data processing system 6200 includes a memory device 6230 implemented with at least one nonvolatile memory and a memory controller 6220 that controls the memory device 6230. Here, the data processing system 6200 shown in FIG. 10, as described in FIG. 1, may be a storage medium such as a memory card (CF, SD, micro-SD, etc.) or a USB storage. The memory device 6230 may correspond to the memory device 150 in the memory system 110 described in FIG. 1, and the memory controller 6220 may correspond to the controller 1130 in the memory system 110 described in FIG. 1.

In addition, the memory controller 6220 controls a read operation, a write operation, an erase operation, and the like on the memory device 6230 in response to a request of a host 6210, and the memory controller 6220 includes at least one CPU 6221, a buffer memory, e.g., a RAM 6222, an ECC circuit 6223, a host interface 6224, and a memory interface, e.g., an NVM interface 6225.

Here, the CPU 6221 may control overall operations of the memory device 6230, such as read, write, file system management, bad page management, and the like. In addition, the RAM 6222 operates according to the control of the CPU 6221, and may be used as a work memory, a buffer memory, a cache memory, etc. Here, when the RAM 6222 is used as a work memory, data processed by the CPU 6221 may be temporarily stored. When the RAM 6222 is used as a buffer memory, the RAM 6222 may be used to buffer data transmitted from the host 6210 to the memory device 6230 or data transmitted from the memory device 6230 to the host 6210. When the RAM 6222 is used as a cache memory, the RAM 6222 may be used to allow the low-speed memory device 6230 to operate at high speed.

In addition, the ECC circuit 6223 corresponds to the ECC unit 138 of the controller 130 described in FIG. 1, and generates an error correction code (ECC) for correcting a fail bit or error bit of data received from the memory device 6230 as described in FIG. 1. Also, the ECC circuit 6223 performs error correction encoding on data provided to the memory device 6230 to generate data to which a parity bit is added. Here, the parity bit may be stored in the memory device 6230. Also, the ECC circuit 6223 may perform error correction decoding on data output from the memory device 6230. In this case, the ECC circuit 6223 may correct an error using a parity. For example, the ECC circuit 6223, as described in FIG. 1, may correct an error using various coded modulations such as LDPC code, BCH code, turbo code, Reed-Solomon code, convolution code, RSC, TCM, and BCM.

In addition, the memory controller 6220 communicates data, etc. with the host 6210 through the host interface 6224, and communicates data, etc. with the memory device 6230 through the NVM interface 6225. Here, the host interface 6225 may be coupled to the host 6210 through a PATA bus, SATA bus, SCSI, USB, PCIe, a NAND interface, etc. Also, the memory controller 6220 may be coupled to the external device, e.g., the host 6210 or another external device except the host 6210 as a wireless communication function, Wi-Fi or long term evolution (LTE) as a mobile communication standard, or the like is implemented, and then communicate data, etc. with the external device. In particular, the memory controller 6220 is configured to communicate with the external device through at least one of various communication standards. Accordingly, the memory system and the data processing system according to the embodiment of the present disclosure can be applied to wired/wireless electronic devices, mobile electronic devices, and the like.

Figure 11:
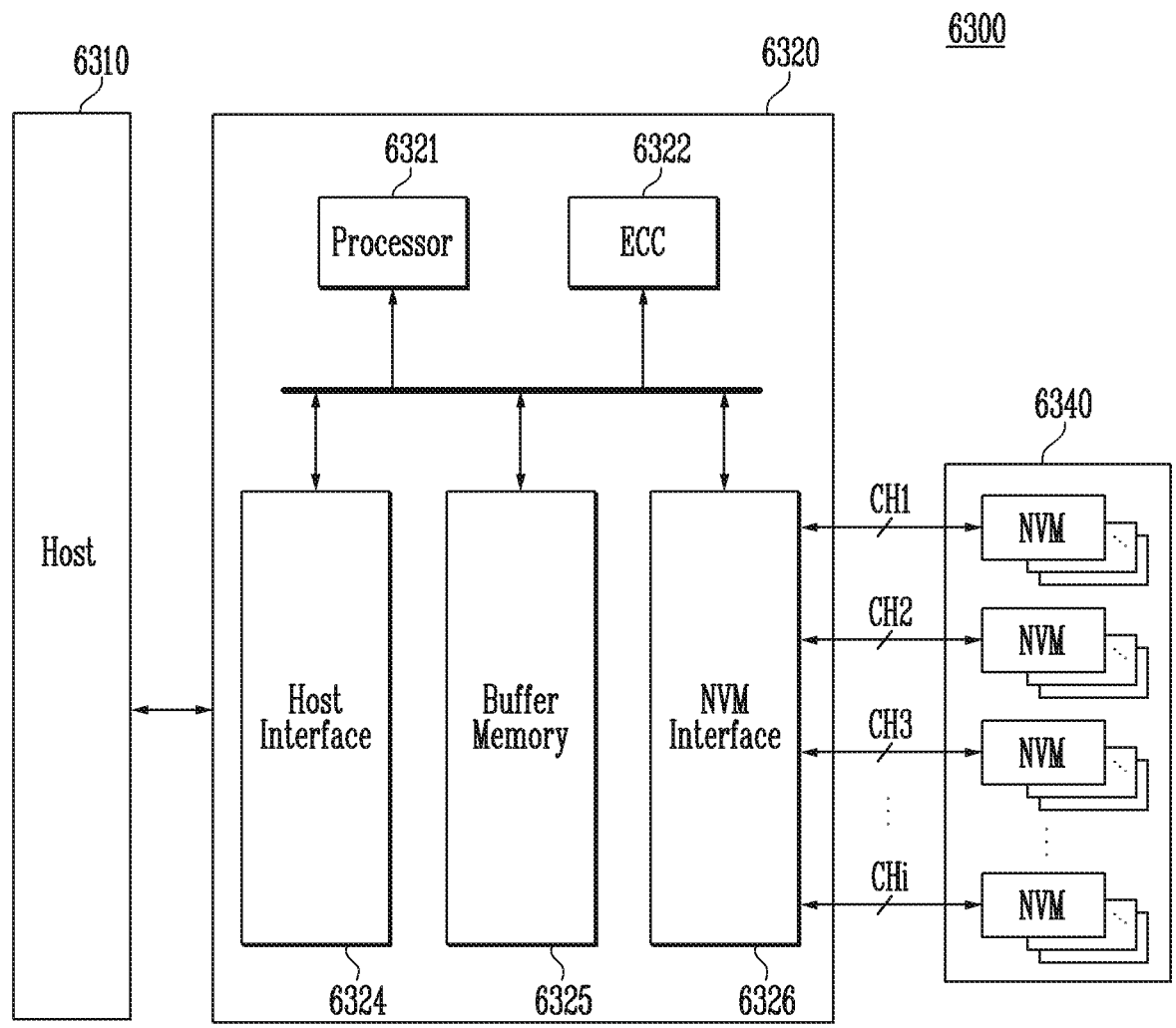

FIG. 11 is a diagram schematically illustrating an application example of the data processing system including the memory system according to the embodiment of the present disclosure. Here, FIG. 11 is a diagram schematically illustrating a solid state drive (SSD) to which the memory system according to the present disclosure is applied.

Referring to FIG. 11, the SSD 6300 includes a memory device 6340 including a plurality of nonvolatile memories and a controller 6320. Here, the controller 6320 may correspond to the controller 130 in the memory system 110 described in FIG. 1, and the memory device 6340 may correspond to the memory device 150 in the memory system 110 described in FIG. 1.

More specifically, the controller 6320 is coupled to the memory device 6340 through a plurality of channels CH1, CH2, CH3, . . . , CHi. Also, the controller 6320 includes at least one processor 6321, a buffer memory 6325, an ECC circuit 6322, a host interface 6324, and a memory interface, e.g., a nonvolatile memory (NVM) interface 6326.

Here, the buffer memory 6325 temporarily stores data received from a host 6310 or data received from a plurality of flash memories NVMs included in the memory device 6340, or temporarily stores meta data of the plurality of flash memories NVMs, e.g., map data included in a mapping table. Also, the buffer memory 6325 may be implemented with volatile memories such as DRAM, SDRAM, DDR SDRAM, to LPDDR SDRAM, SRAM, and GRAM or nonvolatile memories such as FRAM ReRAM, STT-MRAM, and PRAM. For convenience of description, a case where the buffer memory 6325 exists inside the controller 6320 is illustrated in FIG. 11, but the buffer memory 6325 may exist outside the controller 6320.

In addition, the ECC circuit 6322 calculates an error correction code value of data to be programmed to the memory device 6340 in a program operation, performs an error correction operation on data read from the memory device 6340 in a read operation, based on the error correction code value, and performs an error correction operation on data restored from the memory device 6340 in a restore operation of fail data.

In addition, the host interface 6324 provides an interface function between the controller 6320 and an external device, e.g., the host 6310, and the nonvolatile memory interface 6326 provides an interface function between the controller 6320 and the memory device 6340 coupled to the controller 6320 through the plurality of channels.

In addition, the SSD 6300 to which the memory system 110 described in FIG. 1 may be applied in plurality to implement a data processing system, e.g., a redundant array of independent disks (RAID) system. In this case, a plurality of SSDs 6300 and a RAID controller that controls the plurality of SSDs 6300. Here, when a program operation is performed by receiving a write command from the host 6310, the RAID controller may select at least one memory system, i.e., an SSD 6300 among the plurality of SSDs 6300, corresponding to a plurality of RAID levels, i.e., RAID level information of the write command received from the host 6310, and then output data corresponding to the write command to the selected SSD 6300. Also, when a read operation is performed by receiving a read command from the host 6310, the RAID controller may select at least one memory system, i.e., an SSD 6300 among the plurality of SSDs 6300, corresponding to a plurality of RAID levels, i.e., RAID level information of the write command received from the host 6310, and then provided data from the selected SSD 6300 to the host 6310.

Figure 12:
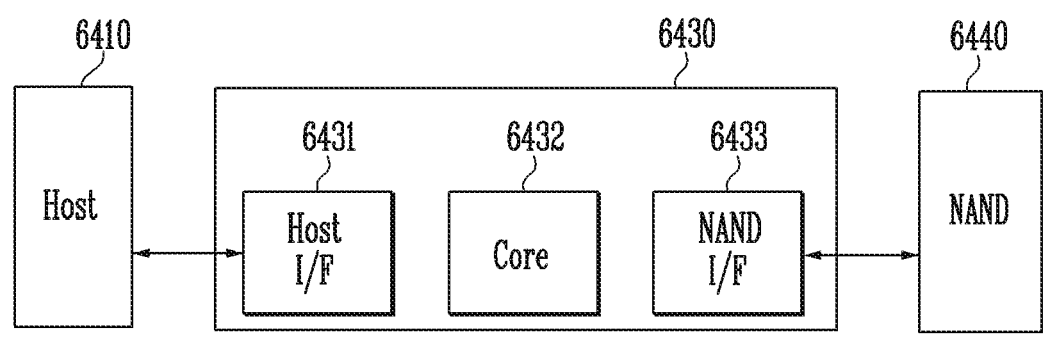

FIG. 12 is a diagram schematically illustrating an application example of the data processing system including the memory system according to the embodiment of the present disclosure. Here, FIG. 12 is a diagram schematically illustrating an embedded multimedia card (eMMC) to which the memory system according to the present disclosure is applied.

Referring to FIG. 12, the eMMC 6400 includes a memory device 6440 implemented with at least one NAND flash memory and a controller 6430. Here, the controller 6430 may correspond to the controller 130 in the memory system 110 described in FIG. 1, and the memory device 6440 may correspond to the memory device 150 in the memory system 110 described in FIG. 1.

More specifically, the controller 6430 is coupled to the memory device 6440 through a plurality of channels. Also, the controller 6430 includes at least one core 6432, a host interface 6431, and a memory interface, e.g., a NAND interface 6433.

Here, the core 6432 controls overall operations of the eMMC 6400, the host interface 6431 provides an interface function between the controller 6430 and a host 6410, and the NAND interface 6433 provides an interface function between the memory device 6440 and the controller 6430. For example, the host interface 6431, as described in FIG. 1, may be a parallel interface, e.g., an MMC interface. In addition, the host interface 6431 may be a serial interface, e.g., an ultra high speed (UHS)-I/UHS-II, UFS interface.

According to the present disclosure, a plurality of SPOT entries are managed by dividing SPOT data in a logical block address (LBA) range. When a new SPOT entry is generated or when the number of times of performing a read operation on the existing SPOT entry increases, the SPOT table is managed using the LRU algorithm, so that SPOT data can be efficiently managed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
   a memory device including a plurality of memory blocks for storing data; and
   a controller configured to include an assembly group table including a plurality of assembly group entries, and to include assembly group counts which correspond to the plurality of assembly group entries, respectively;
   wherein each of the plurality of assembly group entries includes a group of logical block addresses, wherein each of the assembly group counts represents a count of requests from a host for a corresponding assembly group entry, wherein the controller adds a new assembly group entry to the assembly group table according to a request from the host, wherein an assembly group count corresponding to the new assembly group entry is greater than each of the assembly group counts corresponding to each of the plurality of assembly group entries, wherein the controller performs a read reclaim operation on data corresponding to an assembly group entry of which an assembly group count exceeds a critical value, and wherein the controller registers an assembly group entry having an assembly group count larger than the critical value as a real assembly group by scanning the assembly group counts of the plurality of assembly group entries.

2. The memory system of claim 1, wherein the controller includes:
a memory configured to store the assembly group table; and
a processor configured to manage the assembly group table stored in the memory.

3. The memory system of claim 2, wherein the plurality of assembly group entries correspond to different assembly group counts, respectively.

4. The memory system of claim 3, wherein the assembly group table is configured with the plurality of assembly group entries including a head entry and a tail entry,
wherein the head entry represents an assembly group entry corresponding to a highest assembly group count among the plurality of assembly group entries, and
wherein the tail entry represents an assembly group entry corresponding to a lowest assembly group count among the plurality of assembly group entries.

5. The memory system of claim 4, wherein, when the new assembly group entry is added to the assembly group table, the processor manages the assembly group table by designating the new assembly group entry as the head entry and moving the plurality of assembly group entries one by one in the direction of the tail entry.

6. The memory system of claim 5, wherein, when the new assembly group entry is added to the assembly group table, the processor deletes the tail entry.

7. The memory system of claim 4, wherein, when a read operation of a selected assembly group entry among the plurality of assembly group entries is performed in response to the request from the host, the processor moves the selected assembly group entry in the direction of the head entry by allowing an assembly group count of the selected assembly group entry to be increased by 1.

8. The memory system of claim 1, wherein, when the real assembly group is detected, the controller controls the memory device to perform the read reclaim operation on data corresponding to the real assembly group.

9. A method for operating a memory system, the method comprising:
creating an assembly group table including a plurality of assembly group entries each of which includes a group of logical block addresses requested from a host;
allocating assembly group counts to the plurality of assembly group entries, respectively, wherein each of the assembly group counts represents a count of requests from the host for a corresponding entry;

when a new assembly group entry is added to the assembly group table according to a request from the host, allocating an assembly group count greater than each of the assembly group counts corresponding to each of the plurality of assembly group entries, to the new assembly group entry, performing a read reclaim operation on data corresponding to an assembly group entry of which an assembly group count exceeds a critical value, and registering an assembly group entry having an assembly group count larger than the critical value as a real assembly group by scanning the assembly group counts of the plurality of assembly group entries.

10. The method of claim 9, wherein the plurality of assembly group entries have different assembly group counts, respectively.

11. The method of claim 10,
further comprising, evicting a tail entry having a lowest assembly group count among the plurality of assembly group entries from the assembly group table when the new assembly group entry is added to the assembly group table.

12. The method of claim 10, wherein the read reclaim operation is performed on data having logical block addresses corresponding to the real assembly group.

13. A memory controller comprising:
a memory configured to store an assembly group table including a plurality of assembly group entries, and to store assembly group counts which correspond to the plurality of assembly group entries, respectively, wherein each of the plurality of assembly group entries includes a group of logical block addresses, wherein each of the assembly group counts represents a count of requests from a host for a corresponding assembly group entry; and
a processor configured to control the memory to add a new assembly group entry to the assembly group table according to a request from the host,
wherein an assembly group count corresponding to the new assembly group entry is greater than each of the assembly group counts corresponding to each of the plurality of assembly group entries, and
wherein the processor performs a read reclaim operation on data corresponding to an assembly group entry of which an assembly group count exceeds a critical value, and registers an assembly group entry having an assembly group count larger than the critical value as a real assembly group by scanning the assembly group counts of the plurality of assembly group entries.

14. The memory controller of claim 13, wherein the plurality of assembly group entries correspond to different assembly group counts, respectively.

15. The memory controller of claim 14, wherein, when the processor adds the new assembly group entry to the assembly group table, the processor controls the memory to evict an assembly group entry corresponding to a lowest assembly group count, among the plurality of assembly group entries.

16. The memory controller of claim 14, wherein, when a request for a selected assembly group entry among the plurality of assembly group entries is transferred from the host to the memory controller, the processor controls the memory to move a location of the selected assembly group entry in a direction of a head entry on the assembly group table by increasing an assembly group count corresponding to the selected assembly group entry by 1, and wherein the head entry represents an assembly group entry corresponding to a highest assembly group count among the plurality of assembly group entries.

\* \* \* \* \*